United States Patent

Nhu

Patent Number: 5,848,224
Date of Patent: Dec. 8, 1998

[54] OPTIMALLY PIPELINED ERROR DIFFUSION ARCHITECTURE FOR CONVERTING SCANNED IMAGE INTO FOUR-COLOR PRINTED IMAGE

[75] Inventor: Hoang Nhu, Irvine, Calif.

[73] Assignee: Hewlett-Packard Company, Palo Alto, Calif.

[21] Appl. No.: 721,286

[22] Filed: Sep. 26, 1996

[51] Int. Cl.$^6$ .............................. G06F 15/00; H04N 1/21; H04N 1/40
[52] U.S. Cl. ......................... 395/109; 395/101; 358/298; 358/447; 358/448; 358/455; 358/456; 358/465
[58] Field of Search .................................... 358/447, 448, 358/455, 456, 465, 429, 457, 298, 459, 460; 395/101, 102, 109; 382/252, 254

[56] References Cited

U.S. PATENT DOCUMENTS

| | | | |
|---|---|---|---|
| 4,878,125 | 10/1989 | Katayama et al. | 358/456 |
| 5,204,760 | 4/1993 | Murayama et al. | 358/456 |
| 5,271,070 | 12/1993 | Truong et al. | 358/465 |
| 5,553,165 | 9/1996 | Webb et al. | 358/465 |
| 5,594,839 | 1/1997 | Shu | 395/109 |
| 5,608,821 | 3/1997 | Metcalfe et al. | 358/445 |
| 5,684,932 | 11/1997 | Shu | 395/109 |
| 5,696,601 | 12/1997 | Metcalfe et al. | 358/447 |

*Primary Examiner*—Edward L. Coles
*Assistant Examiner*—Mark Wallerson

[57] ABSTRACT

A color copier machine includes a conventional image scanner for scanning successive swaths of an original document into an image memory and a conventional high quality four-color inkjet printing mechanism for printing each swath as an array of pixels each covered with up to two types of ink (black, or one primary color, or a secondary color combining two primary colors) and an optional color overprint mode in which the blackest pixels may be covered with op to three types of ink (black and one color or three colors). The processing time for the error diffusion and color overprint algorithms is reduced to a minimum time associated with the required number of memory access cycles; to that end, the required memory access and computational operations are organized as pipelined sequences in which multiple computations are performed on previously accessed data while other data from prior computations are being stored in a remote storage or while data required for future computations are being retrieved from the remote storage. A table lookup operation is used to randomize four correction ratios for each pixel; the retrieved 8-bit correction ratio is multiplied by a 10-bit signal representing the remaining error, thereby using one byte read operation (rather than two byte read operations) to obtain a 10-bit accumulated error. The individual pixels are processed in sequential fashion from left to right of the page, one row at a time, with local registers storing the accumulated error for the current pixel and a temporary accumulated error for the four not yet fully processed adjacent pixels in the current row and the next row.

4 Claims, 9 Drawing Sheets

OPTIMALLY PIPELINED ERROR DIFFUSION ARCHITECTURE FOR CONVERTING SCANNED IMAGE INTO FOUR-COLOR PRINTED IMAGE

TECHNICAL FIELD

The present invention relates generally to processing of digital image data and more particularly to conversion of scanned image represented by individual pixels having associated multiple-bit intensity values into a printed image comprising pixels having a more limited number of values in a manner that preserves the average intensity of the original image over an area containing many pixels.

BACKGROUND ART

Grey scale images may be represented in digital form as picture elements ("pixels") of a predetermined size sufficiently small that they blend together when viewed by the naked human eye. A typical pixel size is 300 per inch, with an intensity measured on a scale of 0 to 255 (8 bits). Color images are typically represented as superimposed "planes", each corresponding to a different color of ink. High quality color printing typically uses four colors: black ("K"), cyan ("C"), magenta ("M") and yellow ("Y"), resulting in a total of 4×8=32 bits per pixel.

Various half-tone and dithering processes are known in which a high contrast process (such as printing) is used to reproduce a low contrast image (such as a photograph) whereby average intensity (e.g., the ratio of black pixels to white pixels) of a particular area of the lower resolution image corresponds to the average intensity of the corresponding area of the original image.

Figure 1:
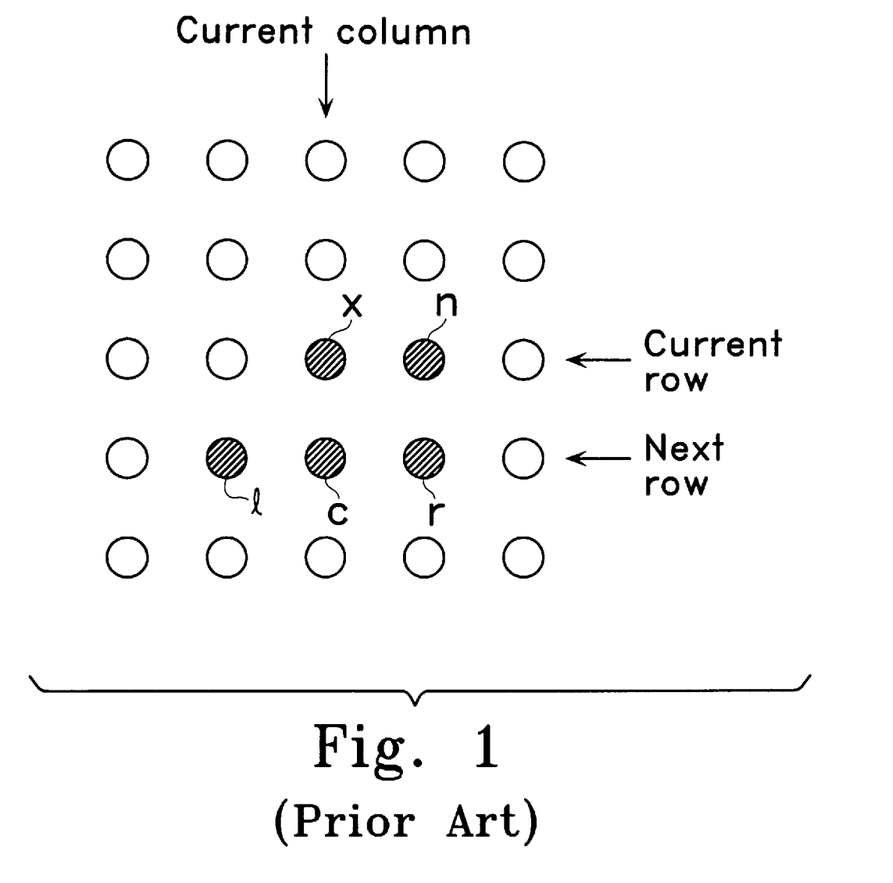
FIG. 1 shows the spatial relationship of the various pixels.

In a known "error diffusion" dithering algorithm, accumulated error from one or more previously processed adjacent pixels in the output image is added to the original digital representation of each pixel in the original image to provide a corrected pixel value which in turn is compared to a threshold (or a series of thresholds, if the output image has more than two intensity levels) to determine the value of the corresponding pixel in the transformed image. Any remaining error (the difference between the corrected pixel value and the binary representation of the corresponding pixel in the output image) is divided up into one or more (typically four) error components and contributes to the accumulated error that is propagated to the same number of neighboring pixels that have not yet been processed. In a typical error diffusion scheme, the pixels are processed sequentially row by row and the error is distributed downstream from the current pixel (x) to four adjacent pixels: the next pixel in the current row (n), the next row's center pixel (c), the next row's right pixel (r), and the next row's left pixel (I) [see FIG. 1]; exemplary values for the correction ratios used to compute the four error components are 7/16, 5/16, 3/16 and 1/16. The error components (remaining error times respective correction ratio) from the four upstream pixels are accumulated for each downstream pixel and applied to the original grey-scale value to provide a respective corrected pixel value that is similarly converted into a low resolution output pixel and a new set of error components. Preferably, the ratio used to obtain the correction factor for a particular adjacent pixel is not constant, but is randomized to avoid artifacts (recurring visible patterns that were not present in the original image) in the output image.

In a known process using inkjet technology to print a full color image from four colors of ink (K=Black, Y=Yellow, C=Cyan and M=Magenta), equal quantities of all three primary colors are replaced by a corresponding quantity of black, at most only two different inks are deposited at the same location of the colored portions of the image, and the blackest portions of the original image are randomly overprinted with dots of colored ink, to provide a more intense black in the darker portions of the image.

DISCLOSURE OF INVENTION

A copier machine includes a conventional image scanner for scanning successive swaths of an original document into an image memory and a conventional inkjet printing mechanism for printing each swath as an array of dots of ink (pixels). Since the scanned image may include many levels of grey (typically 256) and the dots produced by the inkjet printing process are typically located on a fixed grid and are typically all of the same size and density, the present invention contemplates that a computationally intensive half-toning process such as error diffusion will be used to convert the grey-scale data into binary commands indicating whether or not each pixel location is to receive a drop of ink.

In accordance with the present invention, the processing time for the error diffusion algorithm is reduced to a minimum time associated with the required number of memory access cycles. To that end, the required memory access and computational operations are organized as pipelined sequences in which multiple computations are performed on previously accessed data while other data from prior computations are being stored in an addressable memory or data required for future computations are being retrieved from the addressable memory. More particularly, all the computation time in this computationally intensive algorithm is "hidden" by the required memory access operations and does not add to the total processing time.

The preferred error diffusion process uses a single-byte table lookup operation to randomize four correction ratios for each pixel. The individual pixels are processed in sequential fashion, one row at a time, Local registers store an accumulated error for the next pixel in the current row and a partial accumulated error for each of the three not yet fully processed adjacent pixels in the next row, After the first three components of the accumulated error have been computed for one of the pixels in the next row, the partial accumulated error is stored as a 2-byte word in an addressable memory and subsequently retrieved during the processing of the next row. In a four-color printing process, the following operations are required for each pixel in each color plane of the four color planes:

Add the accumulated error for the current pixel to the corresponding data of the grey scale scanned image to compute a corrected grey scale pixel value for current pixel (x).

Compare corrected pixel value (x) with a threshold (T) to obtain a low resolution (binary valued) output pixel (X):

if (x)>T then 1 (X)=else 0 (X)=

Compute the accumulated error to be propagated ($\epsilon$):

if (X)=1 then ($\epsilon$)=x−255 else ($\epsilon$)=x

Retrieve from an addressable RAM the previously accumulated error for the next pixel (n) of the current row.

Use the current pixel location (and preferably the corrected pixel value including the accumulated error) to retrieve four randomized correction ratios ($x_l x_c x_r x_n$) from the addressable RAM.

Apply the four correction ratios to the accumulated error $\epsilon$ from the current pixel to compute four calculated error components ($\epsilon_l, \epsilon_c, \epsilon_r, \epsilon_n$).

Add each of the four calculated error components to the respective previously accumulated error for adjacent pixels ($\epsilon_l, \epsilon_c, \epsilon_n$) (there will not have been any previously processed error component for the right pixel r in the next row).

Temporarily store the accumulated error for the left pixel l of the next row in the addressable RAM, to be retrieved when the processing has advanced to the point where that pixel is now the next pixel n in the current row.

Concurrent processing ("pipelining") is used to reduce overall processing time and thereby maximize throughput, as follows:

For each of the four color planes:
 a) The previously stored 2-byte partial accumulated err (err_lcr) for the next pixel (pixel x+1=pixel n) is retrieved from RAM.
 b) A 1-byte propagated error factor for pixel l in the next row (err_l) is retrieved from RAM and multiplied by a previously calculated 2-byte propagated error from the current pixel. The resulting 2-byte product is added to the partial error for that pixel (calculated during the processing of the error from pixel x-1 temporarily stored in a first scratch register src_1) and the 2-byte sum (which now includes the l, c, and r components of the accumulated error for pixel l) is temporarily stored in an output register (temp).
 c) A 1-byte propagated error factor for pixel c in the next row (err_c) is retrieved from RAM and multiplied by the (2-byte) propagated error from the current pixel. The resulting 2-byte product is added to the previously calculated partial accumulated error for pixel c that was temporarily stored in a second scratch register (src2) and the 2-byte sum (which now includes the c and r components of the accumulated error for pixel c) is temporarily stored in the first scratch register.
 d) A 1-byte propagated error factor for pixel r in the next row (err_r) is retrieved from RAM and multiplied by the (2-byte) propagated error from the current pixel. The resulting 2-byte product (which is the r component of the accumulated error for pixel r) is temporarily stored in the second scratch register (src2).
 e) A 1-byte propagated error factor for the next pixel in the current row (err_n) is retrieved from RAM and multiplied by the (2-byte) propagated error from the current pixel. The resulting product (which is the n component of the accumulated error for pixel n) is added to the partial error for that pixel that was retrieved in step a), and the sum (which now included all four components of the accumulated error for the next pixel) is temporarily stored (acc_err) in an accumulated error register (acc_err).
 f) The accumulated error for the next pixel is added to the original value of that pixel to get the corrected pixel value for the next pixel
 g) The 2-byte partial accumulated error that was computed in step b) and that was temporarily stored in the temporary register, is written to RAM for retrieval during processing of the next row.

(Steps a) through g) are repeated for the other three planes.)

Concurrently with the four repetitions of the above seven steps, seven compare operations are performed on the corrected values generated in step f) for the four color components (K, C, M, & Y) of the next pixel:
 1) Original value of black vs overprint threshold (orgKgThr)
 2) Cyan vs black (CgK)
 3) Magenta vs black (MgK)
 4) Cyan vs magenta (CgM)
 5) Yellow vs black (YgK)
 6) Cyan vs yellow (CgY)
 7) Magenta vs yellow (MgY)

The results of the seven comparisons are used to determine whether K is the largest of the four planes (KMAX) and if not, to identify the two largest colored planes (CY, CM, YC, YM, MC, or MY). In the latter case, the two largest colored planes are each compared with a print threshold and the results (maxgThr, nextmaxgThr), are used to determine whether or not to print a dot of ink for each of those two colored planes.

For each pixel in each of the four planes, the 2-byte error to be propagated to the downstream pixels in that plane is the corrected pixel value (if no dot of ink is printed for that plane) or the corrected pixel value less 255 (if the pixel is to be printed with a dot of ink for that plane). The 2-byte error is used in steps b), c) and d) as part of the look up address for retrieving each of the four error factors and is also used as the 2-byte multiplicand with which each error factor is multiplied, thereby permitting the 2-byte error to be obtained with only a single 1-byte look up operation.

If "color overprint" mode is ON, then if a given pixel is an intense black (KMAX is true and orgKgThr is true), the location of that pixel is used to obtain a mask from a programable 4×4 grid which specifies how each of 16 locations within the grid are to be printed with more than one dot of ink (for example, black plus a randomly selected color, or all three colors) in order to achieve a "darker" black and a more vibrant color image quality.

In the preferred embodiment, each of the write operations to the addressable RAM requires four clock cycles and each read operation from the addressable RAM requires 3 clock cycles. Accordingly, in the preferred embodiment the following I/O operations are required for each pixel in the original image:

READ
 2 reads/plane for the 2-byte partial accumulated error (l,c,r) for pixel n of the current row (1 for lower 8 bits, 1 for upper 2 bits); or 8 reads/pixel
 4 reads/plane for the four 1-byte randomized l, c, r, n error factors; or 16 reads/pixel WRITE
 2 writes/plane for the 2-byte partial accumulated error for the next row (pixel l); or 8 writes/pixel Total Clock cycles: 8*3+16*3+8*4=24+48+32=104

Not only is the number of clock cycles required for accessing the RAM kept to a minimum (for example, by looking up a 1-byte randomized multiplier rather than a 2-byte randomized propagated error component), but also the other required various processes (for example, comparing the corrected pixel values for all four planes with each other and with a predetermined threshold to determine which pixels are to be printed with a dot of one or more of the four inks corresponding to the four planes) are performed concurrently within the time required for the required RAM accesses,

PREFERRED MODE FOR PRACTICING THE INVENTION

Figure 2:
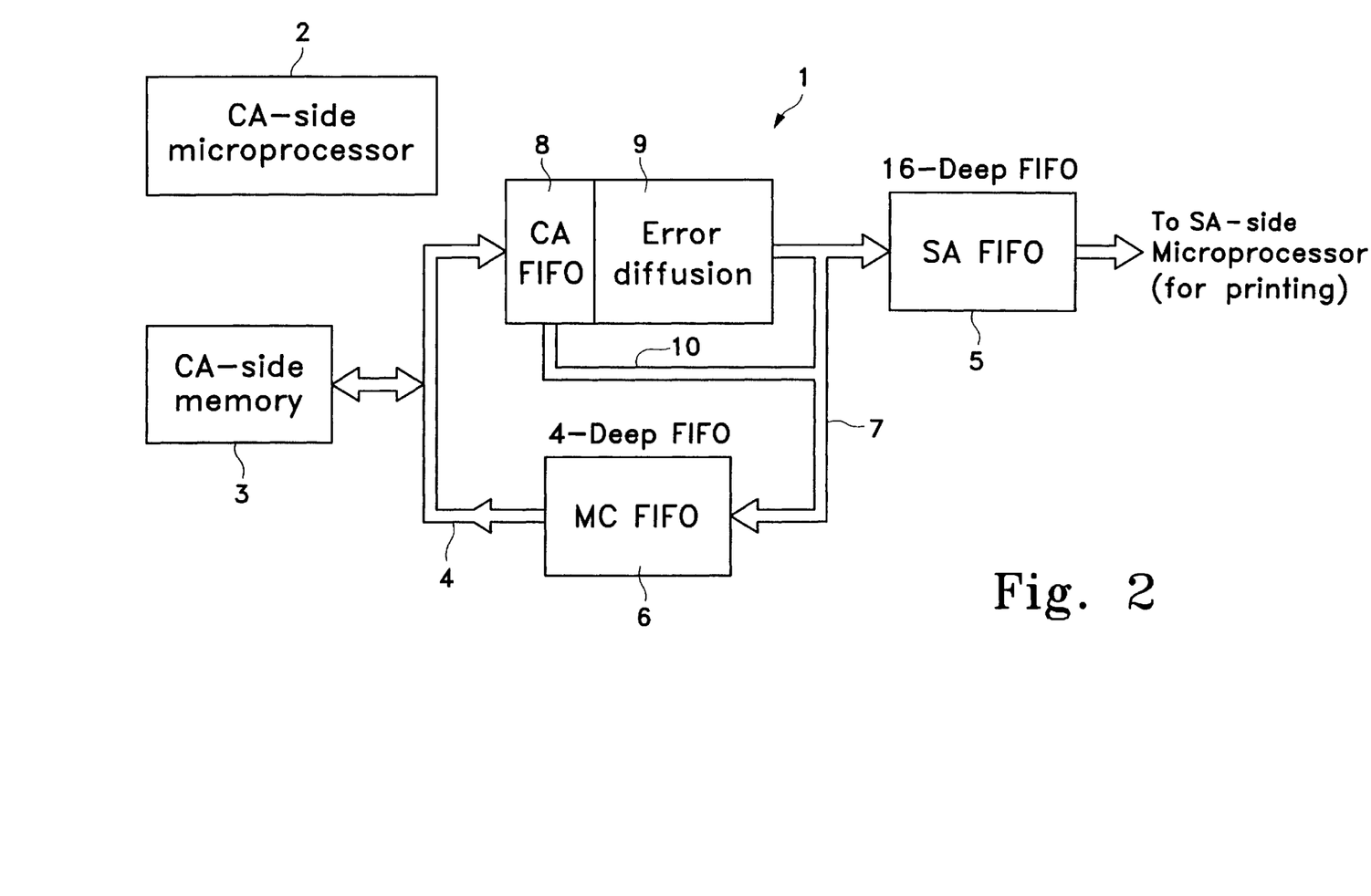
FIG. 2 is a block diagram showing the data flow between the error diffusion logic, the input scanner, and the printer.

Reference should now be made to FIG. 2, which is a block diagram showing the data flow between the half tone processor 1, an input image processor (for example, an Intel CA960) 2 with an associated 8-bit image memory 3 (preferably having a capacity of at least 1 megabyte), a 16-bit wide CA-side bus 4, a 16-bit wide and 16 word deep SA FIFO 5 which acts as a buffer between the half tone processor 1 and the printer microprocessor (typically an Intel SA960, not shown), a 4 word deep multicopy FIFO (First In First Out) 6, and a 16-bit wide SA-side bus 7. The SA-side bus 7 connects the half tone processor 1, the SA FIFO 5, and the multicopy FIFO 6. The half tone processor 1 includes a CA FIFO 8 which functions as an input buffer, logic 9 for implementing the error diffusion and color overprinting functions and an alternative direct path 10 between the CA-side memory 3 and the SA FIFO 5.

Figures 3, 3A:
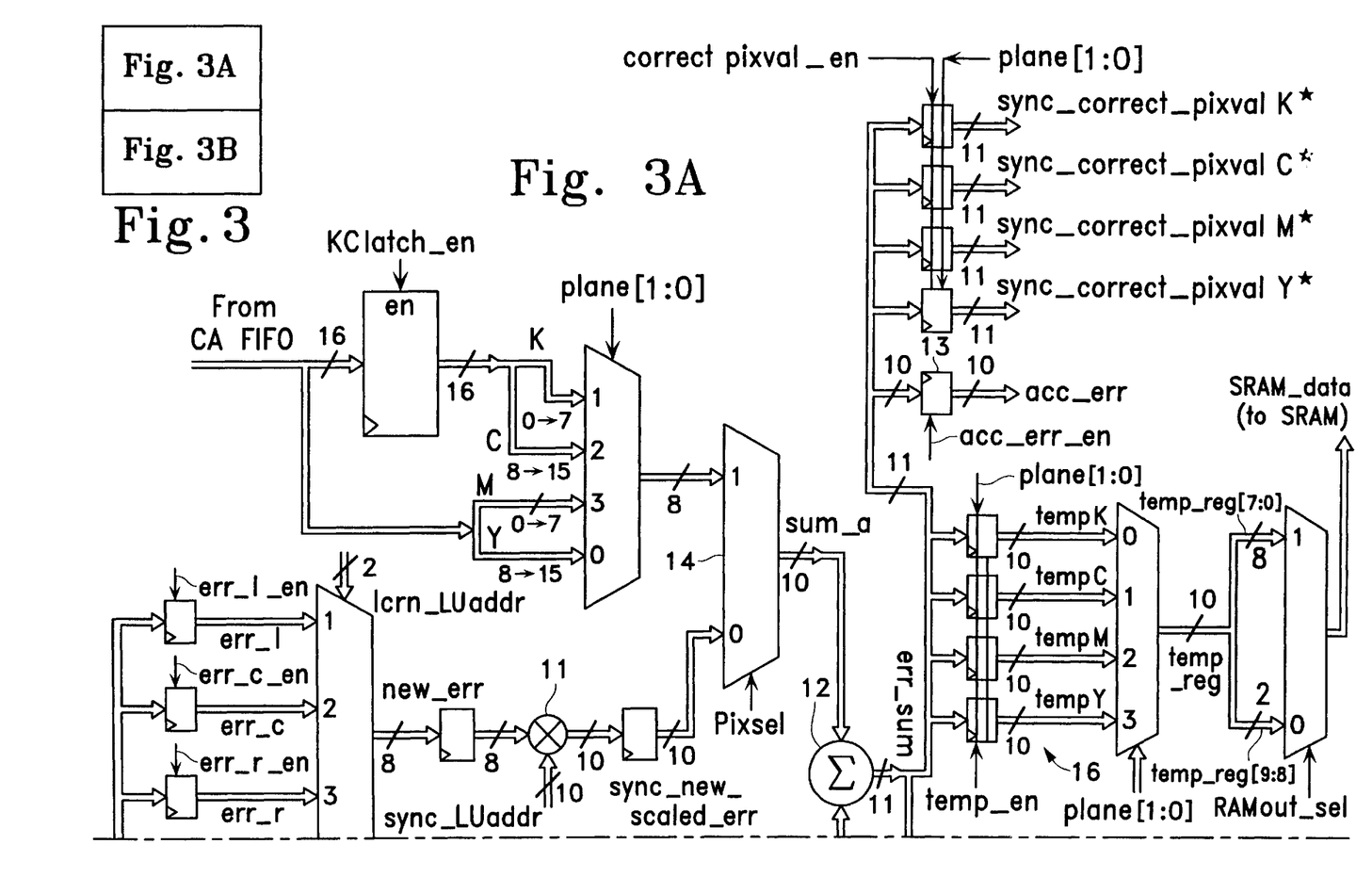
FIG. 3 is a block diagram of the logic for computing a corrected pixel value for the next pixel of the current row and the partial accumulated error used in processing the next row.
Figure 3B:
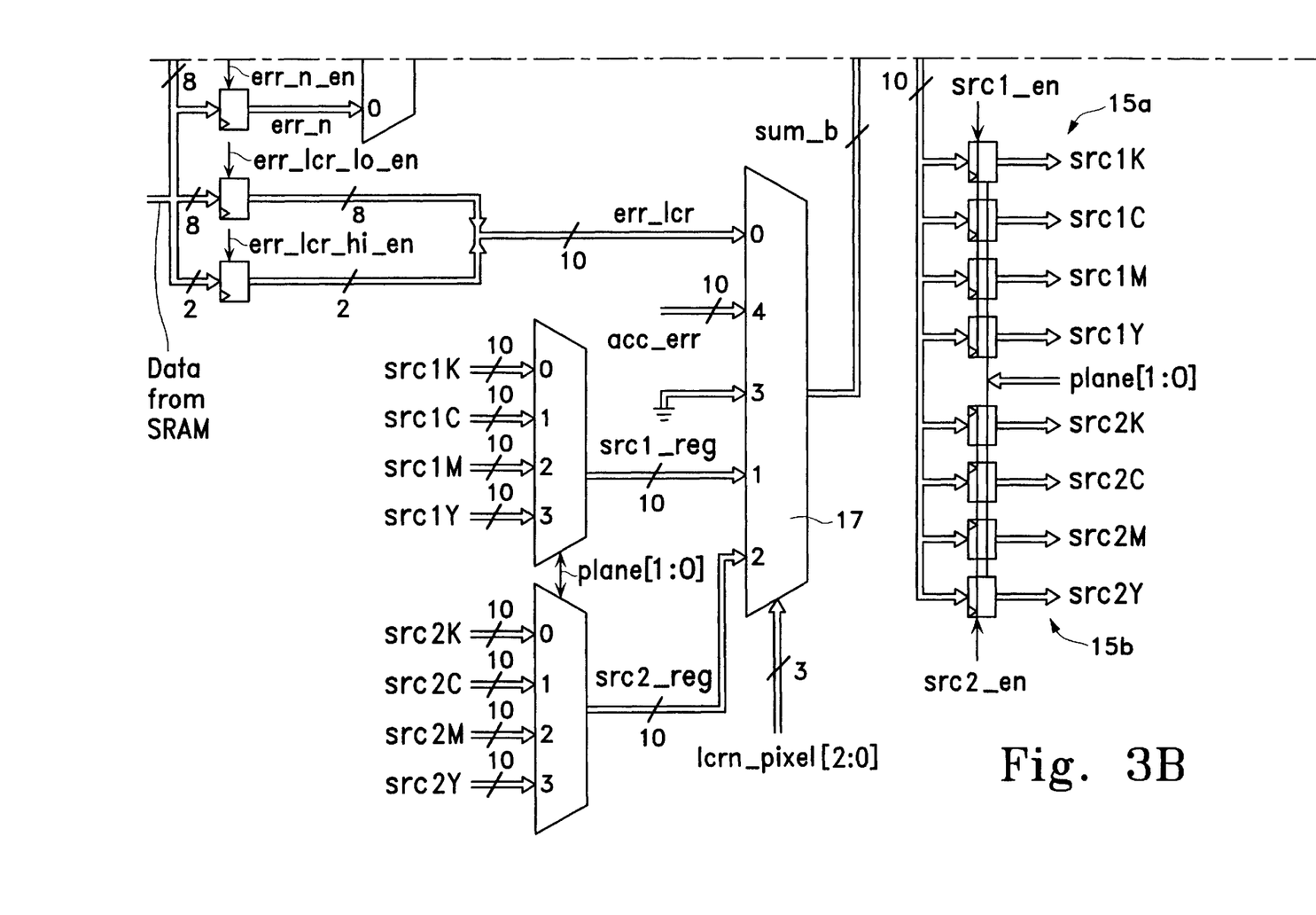

Reference should now be made to FIG. 3, which is a block diagram of exemplary logic for computing a corrected value of the next pixel (pixel n) of each plane and for computing the error components to be propagated from the current pixel to the adjacent pixels in the next row.

Corrected values of the current pixel K*, C*, M*, and Y* (see also FIGS. 4 and 5) are used to compute a corresponding 15-bit look up address (LU_RAMaddr) which includes 10 bits representing the error to be accumulated (synch_LUaddr). Thus, the look-up address is not only used to access the static RAM to obtain the four randomized correction ratios, but also serves as the multiplicand to which those ratios are applied (by means of multiplier 11) to obtain the randomized error components which are propagated to the four adjacent downstream pixels.

The accumulated error (err_lcr) for the next pixel n in the current row that was stored during the processing of the previous row is retrieved from a static RAM included in the error diffusion processor 9, added in summer 12 to the error component from the current pixel (err_n times synch_LUaddr) output from multiplier 11, and loaded (acc_err_en) into the accumulated error register 13.

The data for the next pixel is read from CA FIFO 8 as two successive 16-bit words, each representing the corresponding pixel in two planes (KC or MY); the data for each plane (plane[1:0]) is successively applied to the "1" input of multiplexer 14, added in adder block 12 to the accumulated error (acc_err) and output, in response to synch signal correct_pixval_en, as a respective corrected pixel K*, C*, M*, or Y* for the next pixel.

The error component (err_l times synch_LUaddr) to be propagated from the current pixel to the left pixel in the next row is added to the contents (src1) of a first scratch register 15 and output (temp_en) into to a temporary buffer 16, from which it is output to the SA FIFO 5. The error component (err_c times synch_LUaddr) to be propagated from the current pixel to the center pixel in the next row is added to the contents (src2) of a second scratch register 17 and output (temp_en) into the first scratch register 15. The error component (err_r times synch_LUaddr) to be propagated from the current pixel to the right pixel in the next row is not added to any prior result (ground input to multiplexer 17) but is directly output to the second scratch register 17.

Figures 4, 4A:
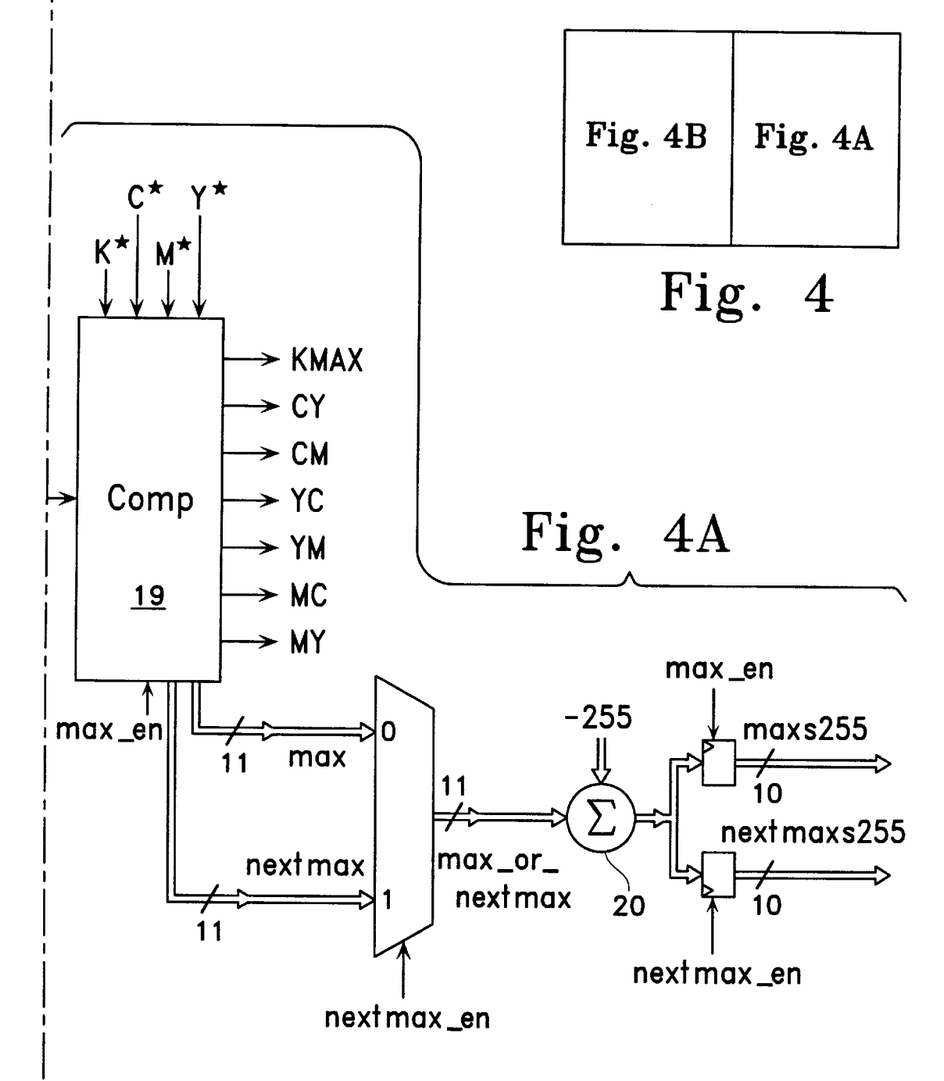
FIG. 4 is a block diagram of the logic for determining if the corrected pixel value is to be printed, and if so, calculates the new error to be propagated.
Figure 4B:
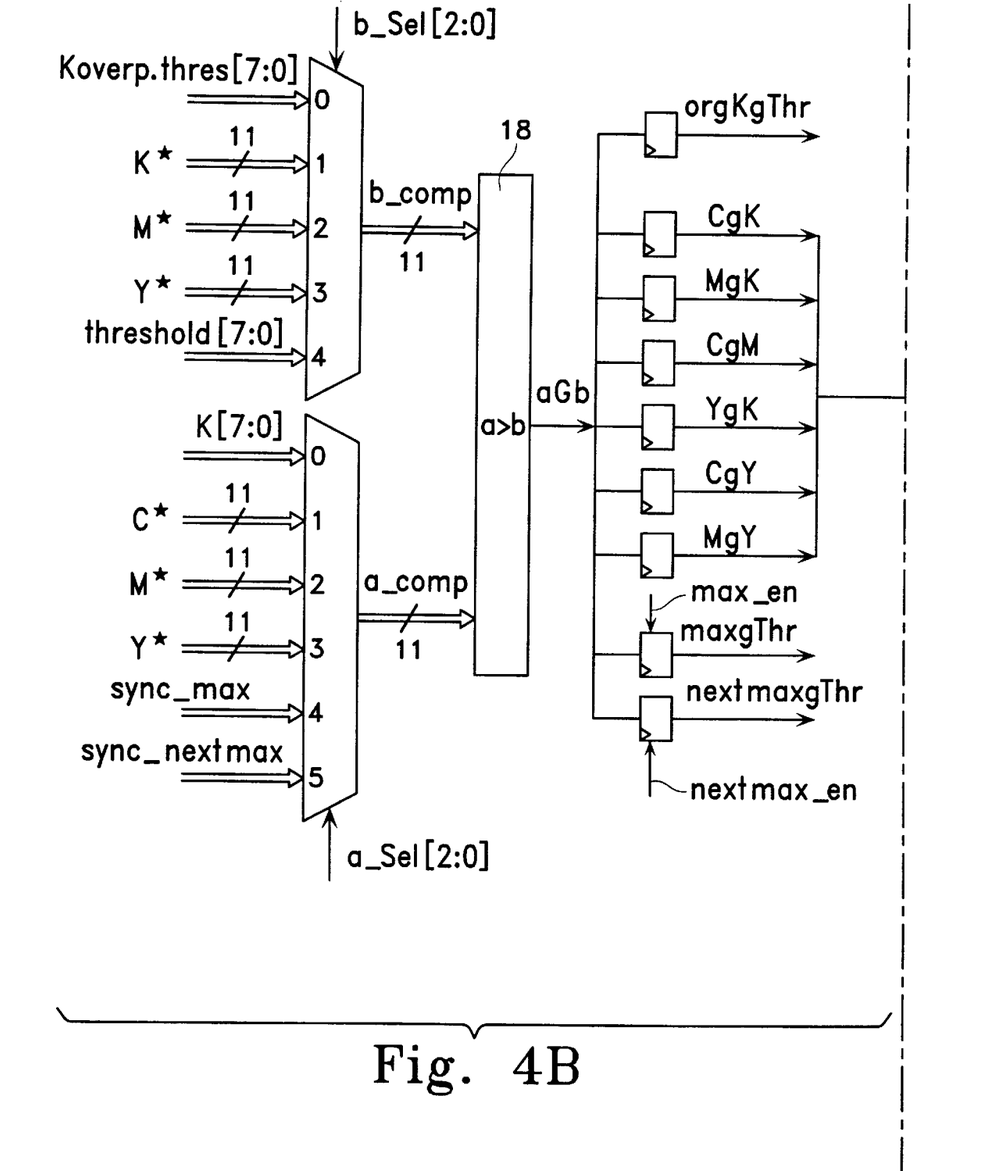
Figure 5:
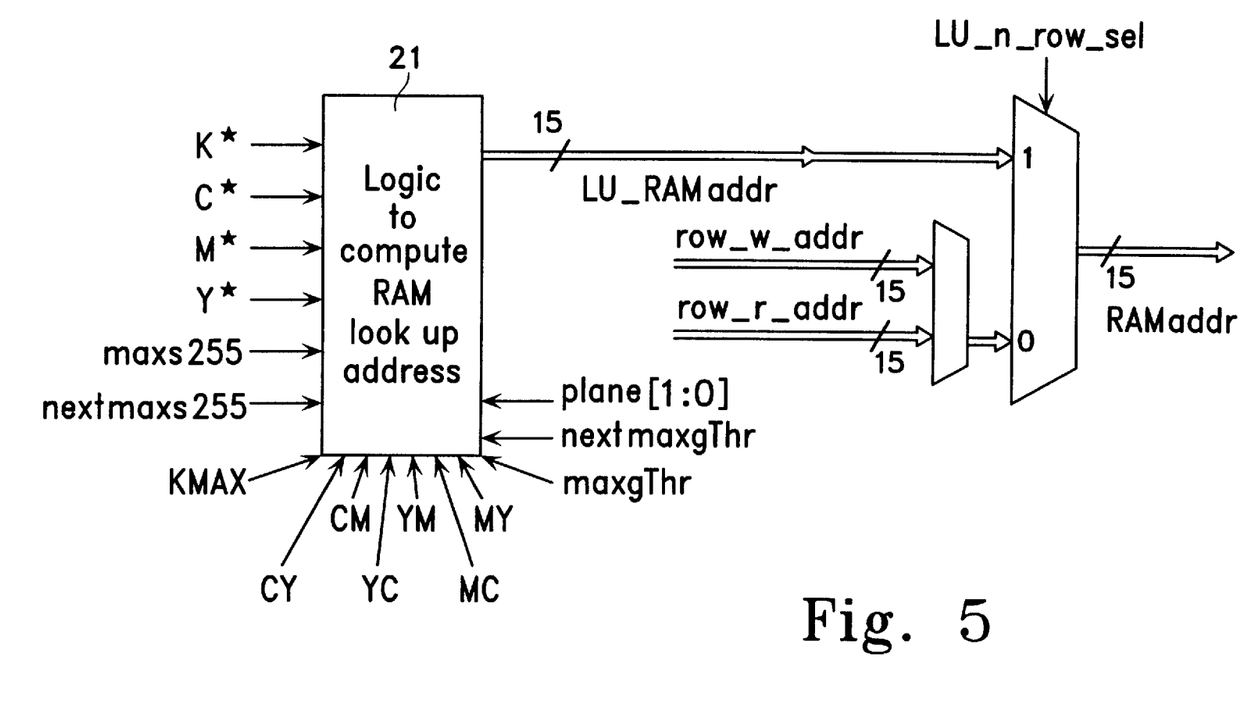
FIG. 5 is a block diagram of the logic for determining a look up RAM address containing a propagated error factor.

Referring now to FIGS. 4 and 5, in accordance with the preferred printing process, the corrected values (K*, C*, M*, Y*) for the next pixel of the current row for each of the four planes are compared with each other and with predetermined thresholds (overprint threshold: Koverp.thres and print threshold: (threshold) in comparator 18. The results of that comparison (orgKgThr, CgK, MgK, CgM, YgB, CgY, MgY) are used by compare logic 19 to determine whether K is the largest of the four planes (KMAX) and if not, to identify the two largest colored planes (CY, CM, YC, YM, MC, or MY) and their repetitive corrected intensity values (max, nextmax). Summer 20 then reduces each of the respective intensities by −255 (maxs255, nextmaxs255) to adjust the accumulated error in the event that the corresponding pixel has been filled with a dot of ink.

As shown in FIG. 5, the results of those comparisons are used by logic 21, to compute the previously mentioned 15-bit look up address (LU_RAMaddr), with 10 bits representing the error to be accumulated to the downstream pixels.

Figure 6:
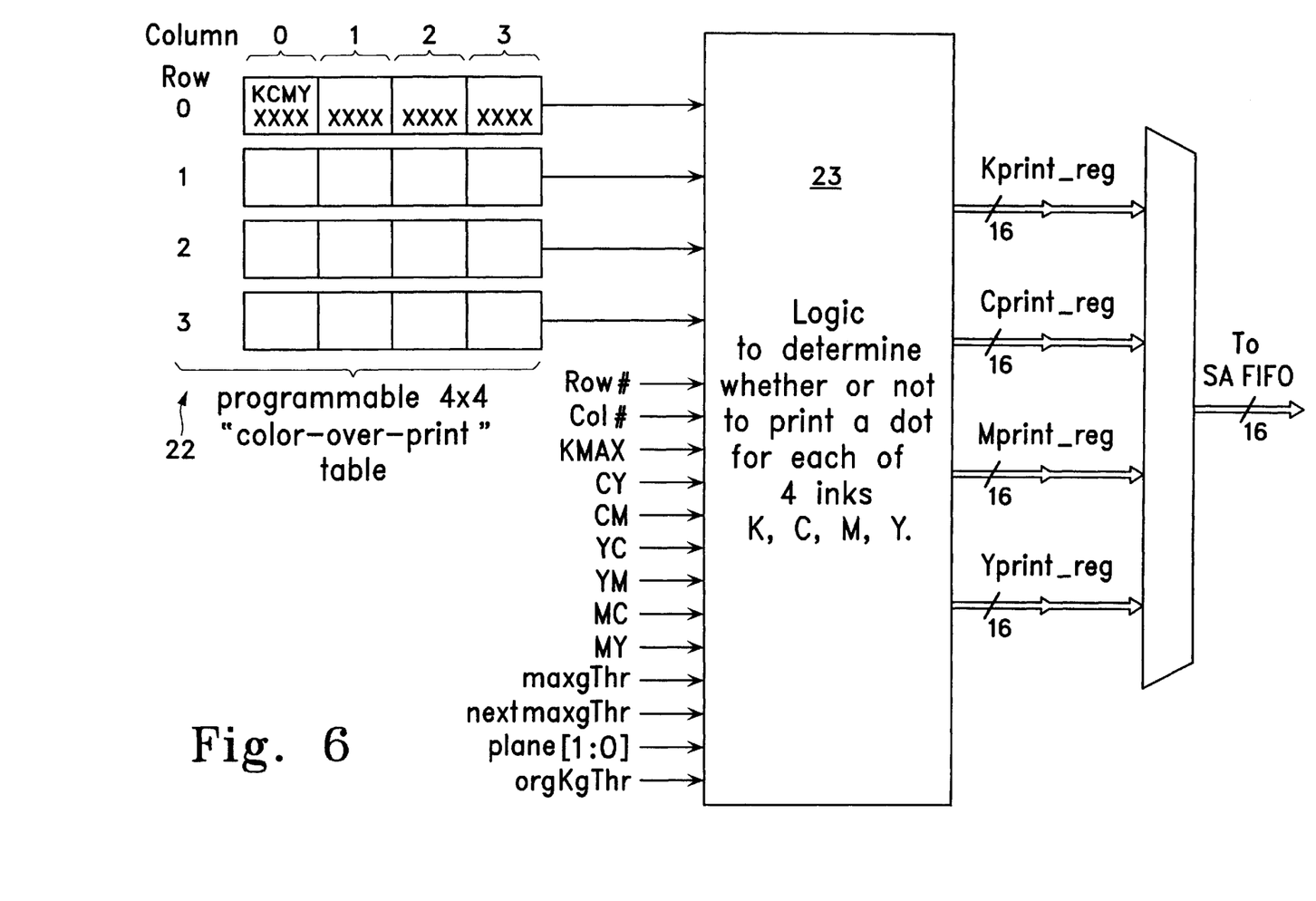
FIG. 6 is a block diagram of the logic for determining what is to be printed at the current pixel.

In the color overprint process shown in FIG. 6, the outputs from the compare logic 19 and from a programable 4×4 color overprint table 22 are input to a logic array 23, which determines whether or not to print a dot for each of the four color planes (K,C,M,Y). The resulting binary valued output is entered into the corresponding bit of the next word to be read into SA FIFO 5.

Figure 7:
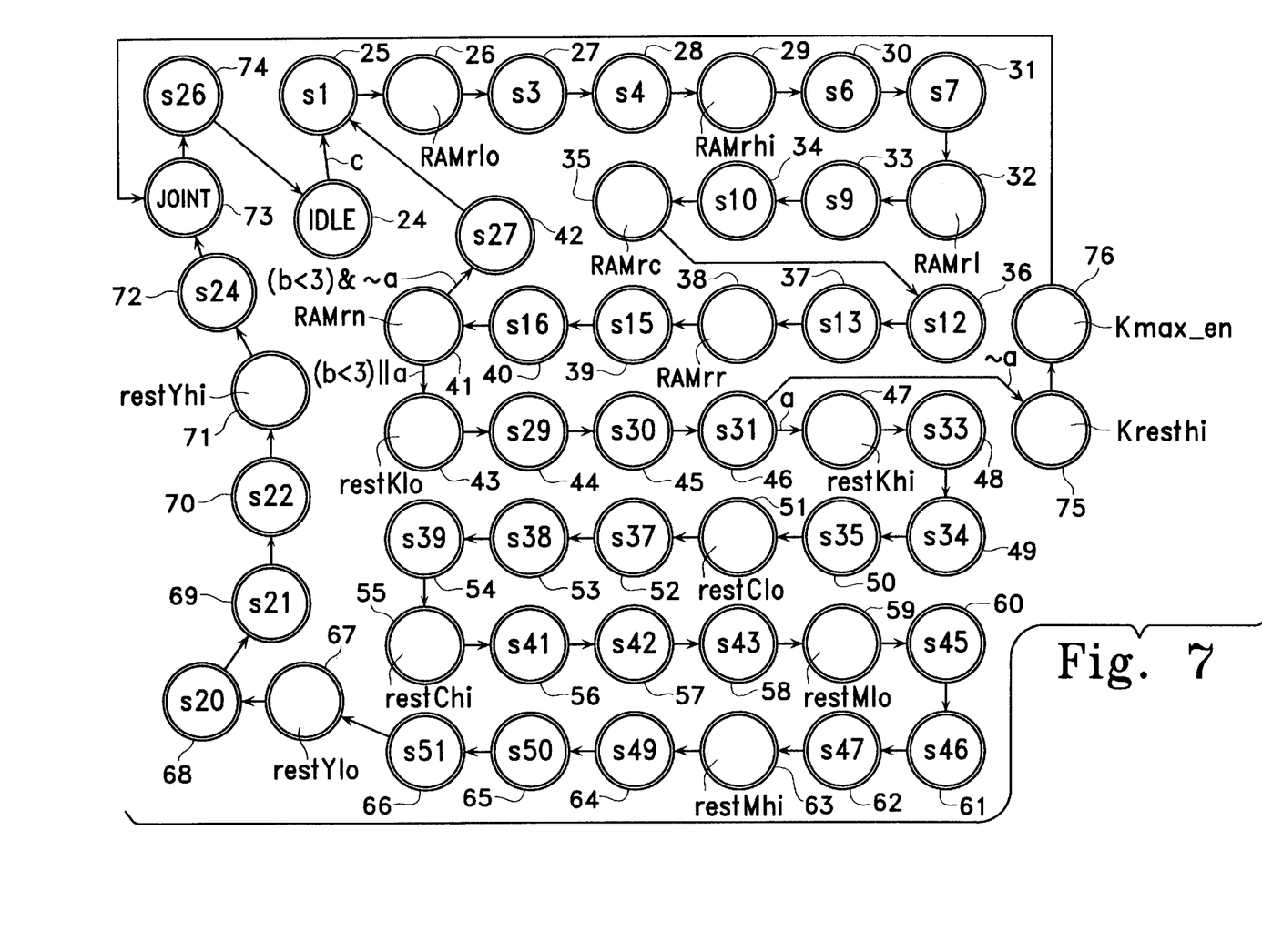
FIG. 7 is a state diagram showing the various memory access processes within the error diffusion logic.

Referring now to FIG. 7, which is a state diagram showing the various memory access processes within the error diffusion logic 9, it may be seen that, starting with IDLE state 24, the error diffusion process begins in response to signal ~start_nOE by successively reading in from RAM current values for:

The lower 8 bits of the partial accumulated error for the next pixel in the current row (states 24, 25, 26)

The upper 2 bits of that partial accumulated error (states 27, 28, 29)

The weighting factor (randomized error ratios) for pixel l (the left pixel in the next row) (states 30, 31, 32), The weighting factor for pixel c (states 33, 34, 35), The weighting factor for pixel r (states 36, 37, 38)

The weighting factor for pixel n (states 39, 40, 41).

In the state diagram of 7, the various control signals controlling the branching from one state to the next state are identified as follows:

| code | control signal | meaning |
|---|---|---|
| a | b_n_c | black mode (not color mode) |
| b | plane[1:0] | number of plane currently being processed (2 bits) |
| c | start_nOE | output buffer empty, ready to begin processing next pixel |

As is conventional, the symbol "&" means logical and the symbol "~" means not.

Assuming that the current image is a full color image (branch ~b_n_c from state 41), the plane count is incremented (planecnt_en=1) and the read process (states 42, through 41) is repeated until all four planes have been processed (branch (plane[1:0]==3). Once all four planes have been processed, or if the current image is a monotone image, (plane[1:0]==3||b_n_c), control then passes to the write process commencing with state 43, wherein first the lower 8 bits of the error to be accumulated to the left pixel l of the next row (states 43, 44, 45, 46) and (assuming the image is a full color image: branch ~b_n_c from state 43) then the upper two bits (states 47, 48, 49, 50) are stored in RAM, followed by a similar 8 clock cycle write process for the low and high bits for the other planes (Cyan, states 51, 52, 53, 54, 55, 56, 57, 58; Magenta, states 59, 60, 61, 62, 63, 64, 65, 66; Yellow, states 67, 68, 69, 70, 71, 72, 73, 74) whereupon control returns to the IDLE state 24. Conversely, if the image is a monochrome black and white image (branch b_n_c from state 43), the upper bits of the accumulated error are written to RAM (states 75, 76, 73, 74) and control returns to the IDLE state 24.

During each clock cycle, the following control signals are output to the error diffusion and overprint logic of FIGS. 3–6.

| Ref No | State (State Name) | Control Signal Output(s) |
|---|---|---|
| 24 | s0 (IDLE) | |
| 25 | s1 | nOE=0 |
| 26 | s2 (RAMrlo) | err_lcr_lo_en=1<br>acc_err_en=1<br>nOE=0 |
| 27 | s3 | corr_pix_en=1<br>nOE=0<br>pixsel=1 |
| 28 | s4 | cmpA_en=1<br>nOE=0 |
| 29 | s5 (RAMrhi) | cmpB_en=1<br>err_lcr_hi_en=1<br>nOE=0 |
| 30 | s6 | nOE=0<br>LUnrow_sel=1 |
| 31 | s7 | nOE=0<br>LUnrow_sel=1 |
| 32 | s8 (RAMrl) | err_l_en=1<br>nOE=0<br>LUnrow_sel=1 |
| 33 | s9 | nOE=0<br>LUnrow_sel=1<br>lcrn_LUaddr[1:0]=1 |
| 34 | s10 | nOE=0<br>LUnrow_sel=1<br>lcrn_LUaddr[1:0]=1 |
| 35 | s11 (RAMrc) | err_c_en=1<br>temp_en=1<br>nOE=0<br>LUnrow_sel=1<br>lcrn_LUaddr[1:0]=1 |
| 36 | s12 | nOE=0 |
| 37 | s13 | LUnrow_sel=1<br>lcrn_LUaddr[1:0]=2<br>nOE=0 |
| 38 | s14 (RAMrr) | LUnrow_sel=1<br>lcrn_LUaddr[1:0]=2<br>err_r_en=1<br>scr1_en=1<br>nOE=0 |
| 39 | s15 | LUnrow_sel=1<br>lcrn_LUaddr[1:0]=2<br>nOE=0 |
| 40 | s16 | LUnrow_sel=1<br>lcrn_LUaddr[1:0]=3<br>nOE=0 |
| 41 | s17 (RAMrn) | LUnrow_sel=1<br>lcrn_LUaddr[1.0]=3<br>err_n_en=1<br>scr2_en=1<br>planecnt_en=1<br>nOE=0 |
| 42 | s27 | LUnrow_sel=1<br>lcrn_LUaddr[1:0]=3<br>nOE=0 |
| 43 | s28 (restKlo) | Kop_en=1<br>row_WnR=1 |
| 44 | s29 | nW=0<br>row_WnR=1<br>RAMout_sel=1 |
| 45 | s30 | acc_err_en=1<br>nW=0<br>npW=0<br>row_WnR=1<br>RAMout_sel=1 |
| 46 | s31 | corr_pix_en=1<br>nW=0<br>npW=0<br>row_WnR=1<br>pixsel=1<br>RAMout_sel=1 |
| 47 | s32 (restKhi) | cmpA_en=1<br>row_WnR=1<br>RAMout_sel=1 |
| 48 | s33 | cmpB_en=1<br>nW=0<br>row_WnR=1 |
| 49 | s34 | cmpC_en=1<br>nW=0<br>npW=0<br>row_WnR=1 |
| 50 | s35 | nW=0<br>npW=0<br>planecnt_en=1<br>row_WnR=1 |
| 51 | s36 (restClo) | row_WnR=1<br>max_en=1 |
| 52 | s37 | nW=0<br>row_WnR=1<br>RAMout_sel=1<br>nextmax_en=1 |
| 53 | s38 | nW=0<br>npW=0<br>row_WnR=1<br>RAMout_sel=1 |
| 54 | s39 | nW=0<br>npW=0<br>row_WnR=1<br>RAMout_sel=1 |
| 55 | s40 (restChi) | row_WnR=1<br>RAMout_sel=1 |
| 56 | s41 | nW=0<br>row_WnR=1 |
| 57 | s42 | nW=0<br>npW=0<br>row_WnR=1 |
| 58 | s43 | nW=0 |

-continued

| Ref No | State (State Name) | Control Signal Output(s) |
|---|---|---|
| 59 | s44 (restMlo) | npW=0<br>planecnt_en=1<br>row_WnR=1<br>row_WnR 1 |
| 60 | s45 | nW=0<br>row_WnR=1<br>RAMout_sel=1 |
| 61 | s46 | nW=0<br>npW=0<br>row_WnR=1<br>RAMout_sel=1 |
| 62 | s47 | nW=0<br>npW=0<br>row_WnR=1<br>RAMout_sel=1 |
| 63 | s48 (restMhi) | row_WnR=1<br>RAMout_sel=1 |
| 64 | s49 | nW=0<br>row_WnR=1 |
| 65 | s50 | nW=0<br>npW=0<br>row_WnR=1 |
| 66 | s51 | nW=0<br>npW=0<br>planecnt_en=1<br>row_WnR=1 |
| 67 | s19 (restYlo) | row_WnR=1<br>nW=0<br>row_WnR=1<br>RAMout_sel=1 |
| 68 | s20 | nW=0<br>row_WnR=1<br>RAMout_sel=1 |
| 69 | s21 | nW=0<br>npW=0<br>row_WnR=1<br>RAMout_sel=1 |
| 70 | s22 | nW=0<br>npW=0<br>row_WnR=1<br>RAMout_sel=1 |
| 71 | s23 (restYhi) | row_WnR=1<br>RAMout_sel=1 |
| 72 | s24 | nW=0<br>row_WnR=1 |
| 73 | s25 (JOINT) | nW=0<br>npW=0<br>row_WnR=1<br>ed_done=1<br>print_reg_en=1 |
| 74 | s26 | nW=0<br>npW=0<br>row_WnR=1<br>planecnt_en=1 |
| 75 | (Kresthi) | row_WnR=1<br>RAMout_sel=1 |
| 76 | (Kmax_en) | nW=0<br>row_WnR=1<br>max_en=1 |

What is claimed is:

1. A method of converting digital image data representing a colored image comprising four planes of individual pixels having associated multiple-bit intensity values into printed image data representing four planes of pixels having only more limited range of intensity values in a manner that preserves the average intensity of the original image over an area containing a plurality of pixels, comprising the steps adding an accumulated error from one or more previously processed pixels to a digital representation of a current pixel to thereby obtain a corrected pixel value;
   comparing the corrected pixel values for the four planes with each other and with a threshold to determine which pixels on which planes are to be represented by a dot of ink in the printed image,
   calculating a remaining error for each plane from the respective corrected pixel value and whether it is represented by a dot of ink in the printed image obtaining a randomized error ratio; and
   applying the randomized error ratio to the remaining error to thereby obtain an accumulated error component to be propagated to one or more neighboring pixels that have not yet been processed,
   wherein;
      the accumulated error is derived from an error component which was stored in an addressable memory during the processing of a prior row of pixels and which is subsequently read from the addressable memory during the processing of a current row of pixels;
      the randomized error ratio is stored in the addressable memory;
      multiple values of the randomized error ratio are retrieved from the addressable memory during the processing of each current pixel, using a different address for each of the neighboring pixels to which a respective accumulated error component is to be propagated from the current pixel;
      each retrieved value of the randomized error ratio is a single byte and the remaining error comprises more than one byte;
      the accumulated error component to be propagated to a particular neighboring pixel of a particular current pixel is obtained by multiplying the corresponding retrieved value of the randomized error ratio by the remaining error for that current pixel;
      each accumulated error component to be propagated to the next row of pixels is stored in the addressable memory during the processing of the current row of pixels;
      the adding, comparing, calculating and multiplying steps are performed in parallel fashion as a plurality of pipelined processes;
      the reading of the previously stored accumulated error component, the reading of the multiple values of the randomized error ratio, and the writing of the accumulated error component to be propagated to next row are performed in sequential fashion as part of a single sequential process concurrently with the pipelined processes; and
      the maximum time required to perform the plurality of pipelined processes is not greater than the minimum time required to perform the single sequential process.

2. The method of claim 1, wherein a portion of the address used to retrieve the randomized error ratio represents the remaining error.

3. The method of claim 1, wherein the pipelined processes include an optional color overprint mode in which a black pixel with an intensity above a predetermined overprint threshold is printed with more than one dot of ink in accordance with a mask from a programable 4×4 grid which specifies randomized combinations of ink to be used for each of 16 locations within the grid.

4. The method of claim 1, wherein the printed image is printed using a high quality four-color inkjet printing process and the pipelined processes include determining, for each colored pixel of the image in which the original intensity of the black plane is less than a predetermined threshold, which two of the three primary colors have a corrected value with the greatest intensity, and whether the corrected intensity values of each of those two colors exceed a predetermined print threshold.

* * * * *